(12) United States Patent
He et al.

(10) Patent No.: US 12,089,209 B2
(45) Date of Patent: Sep. 10, 2024

(54) SYSTEM INFORMATION SCHEDULING FOR REDUCED CAPABILITY DEVICES IN WIRELESS COMMUNICATION

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Yushu Zhang, Beijing (CN); Oghenekome Oteri, San Diego, CA (US); Wei Zeng, Saratoga, CA (US); Weidong Yang, San Diego, CA (US); Yang Tang, San Jose, CA (US); Jie Cui, San Jose, CA (US); Sigen Ye, Whitehouse Station, NJ (US)

(73) Assignee: Apple Inc., Cupertino, CA (US)

( * ) Notice: Subject to any disclaimer, the term of this patent is extended or adjusted under 35 U.S.C. 154(b) by 338 days.

(21) Appl. No.: 17/440,165

(22) PCT Filed: Jul. 29, 2020

(86) PCT No.: PCT/CN2020/105520
§ 371 (c)(1),
(2) Date: Sep. 16, 2021

(87) PCT Pub. No.: WO2022/021144
PCT Pub. Date: Feb. 3, 2022

(65) Prior Publication Data
US 2022/0304022 A1 Sep. 22, 2022

(51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0061* (2013.01); *H04L 1/08* (2013.01);
(Continued)

(58) Field of Classification Search
None
See application file for complete search history.

(56) References Cited

U.S. PATENT DOCUMENTS

| 3,413,646 A | 11/1968 | Whitehead et al. |
| 2019/0090178 A1 | 3/2019 | Liu et al. |

(Continued)

FOREIGN PATENT DOCUMENTS

| CN | 110621073 | 12/2019 |
| EP | 3100400 | 12/2016 |

OTHER PUBLICATIONS

International Patent Application No. PCT/CN2020/105520, International Search Report and Written Opinion, Mailed on Apr. 8, 2021, 9 pages.
(Continued)

*Primary Examiner* — Anh Ngoc M Nguyen
(74) *Attorney, Agent, or Firm* — Kilpatrick Townsend & Stockton LLP

(57) ABSTRACT

The present application relates to devices and components including apparatus, systems, and methods for system information scheduling for reduced capability devices in wireless communication systems.

20 Claims, 10 Drawing Sheets

(51) Int. Cl.
  *H04L 1/08* (2006.01)
  *H04L 5/00* (2006.01)
  *H04W 72/044* (2023.01)
  *H04W 72/0446* (2023.01)
  *H04W 72/0453* (2023.01)

(52) U.S. Cl.
  CPC ....... *H04L 5/0051* (2013.01); *H04W 72/0446* (2013.01); *H04W 72/0453* (2013.01); *H04W 72/0466* (2013.01)

(56) References Cited

U.S. PATENT DOCUMENTS

| | | | |
|---|---|---|---|
| 2019/0394691 A1* | 12/2019 | Shih | H04W 36/0072 |
| 2020/0008235 A1* | 1/2020 | Sarkis | H04L 5/0055 |
| 2023/0117080 A1* | 4/2023 | Lei | H04L 5/0012 370/329 |

OTHER PUBLICATIONS

Key directions for Release 17, Nokia, 3GPP TSG RAN Meeting #84, RP-190831, Jun. 3-6, 2019, 13 pages.
NR-Lite for Rel-17 Qualcomm views, 3GPP TSG RAN Meeting #84, RP-190844, Jun. 3-6, 2019, 11 pages.
NR-Lite for Industrial Sensors and Wearables, 3GPP TSG RAN Meeting #84, RP-191047, Jun. 3-6, 2019, 11 pages.
Motivation for NR-Lite: IoT over NR, Samsung, 3GPP TSG RAN Meeting #84, RP-191175, Jun. 10-14, 2019, 7 pages.
New SID on NR-Lite devices and related technical enhancement, ZTE, Sanechips, 3GPP TSG RAN Meeting #84, RP-191227, Jun. 2-8, 2019, 7 pages.
3rd Generation Partnership Project; Technical Specification Group Radio Access Network; NR;User Equipment (UE) radio transmission and reception; Part 1: Range 1 Standalone (Release 16), 3GPP TS 38.101-1 V16.4.0, Jun. 2020, 406 pages.
3rd Generation Partnership Project; Technical Specification Group Radio Access Network; NR; Physical channels and modulation (Release 16), 3GPP TS 38.211 V16.2.0, Jun. 2020, 131 pages.
3rd Generation Partnership Project; Technical Specification Group Radio Access Network; NR; Physical layer procedures for control (Release 16), 3GPP TS 38.213 V16.2.0, Jun. 2020, 176 pages.
3rd Generation Partnership Project; Technical Specification Group Radio Access Network; NR; User Equipment (UE) radio access capabilities (Release 16), 3GPP TS 38.306 V16.1.0, Jul. 2020, 106 pages.
3rd Generation Partnership Project; Technical Specification Group Radio Access Network; NR; Radio Resource Control (RRC) protocol specification (Release 16), 3GPP TS 38.331 V16.1.0, Jul. 2020, 906 pages.
New 3GPP Release-17 Study Item on NR-Lite (a.k.a. NR-Light), The 3G4G Blog, https://blog.3g4g.co.uk/2019/08/new-3gpp-release-17-study-item-on-nr.html, Aug. 13, 2019, 6 pages.
International Patent Application No. PCT/CN2020/105520, International Preliminary Report on Patentability, Feb. 9, 2023, 6 pages.

* cited by examiner

600

Determining a repetition value for PDCCH of a Type 0 CSS
604

Decoding the PDCCH based on the number of repetitions to determine scheduling information for reduced capability SIB1
608

Decoding the reduced capability SIB1
612

700

Determining initialization value of a DMRS sequence to decode DMRS
704

Estimating a propagation channel for a PDCCH transmission based on the DMRS
708

Determining number of repetitions of PDCCH transmission based on initialization parameter
712

Processing the PDCCH transmission in a Type 0 Common SSS based on propagation channel and number of repetitions
716

SYSTEM INFORMATION SCHEDULING FOR REDUCED CAPABILITY DEVICES IN WIRELESS COMMUNICATION

CROSS REFERENCE TO RELATED APPLICATION

This application is the U.S. National Phase of PCT Application No. PCT/CN2020/105520, filed Jul. 29, 2020, the disclosure of which is incorporated by reference.

BACKGROUND

Reduced-capability New Radio "NR" devices may be used in Third Generation Partnership Project "3GPP" networks. Features and parameter lists with lower-end capabilities may be needed relative to Release 16 and future releases enhanced mobile broadband "eMBB" and ultra-reliable and low-latency communication "URLCC" in NR. These reduced capability devices may be used for industrial wireless sensors, video surveillance, or wearable devices. Some UE reduction features include reduced number of receive/transmit antennas, UE bandwidth reduction, half-duplex frequency division duplexing, relaxed UE processing time, and relaxed UE processing capability.

DETAILED DESCRIPTION

Figure 1:
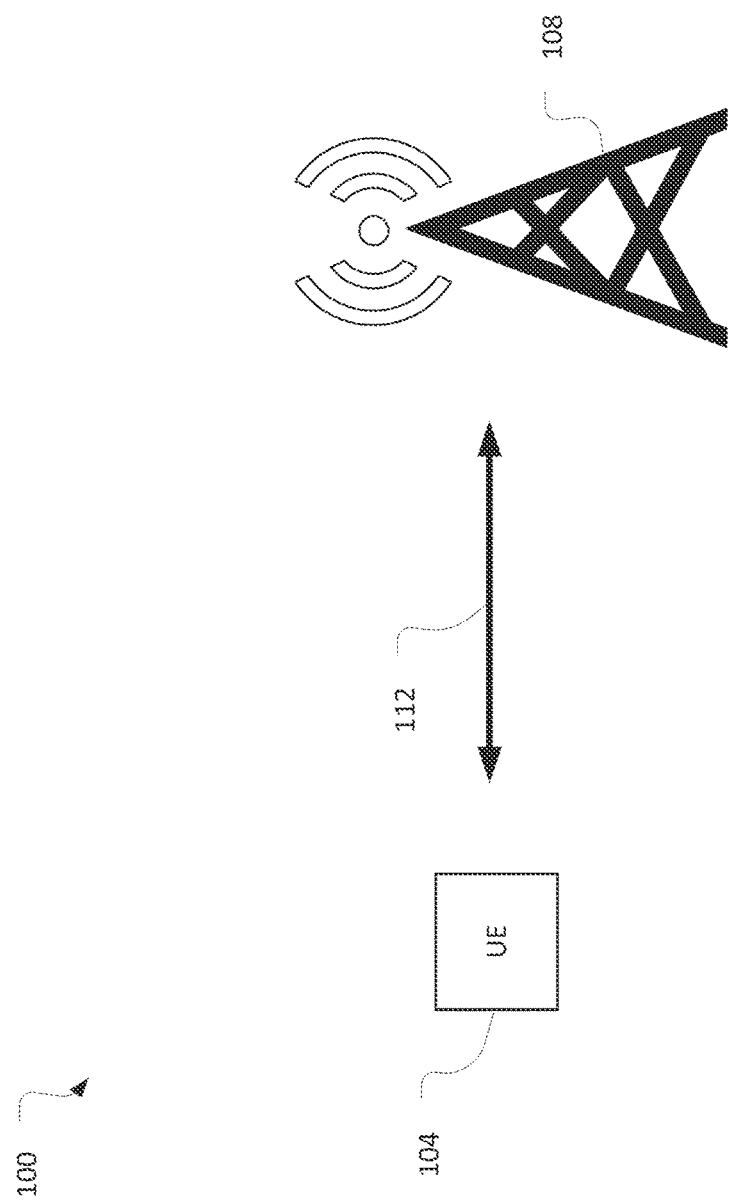
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B)

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit "ASIC," a field-programmable device "FPD" (e.g., a field-programmable gate array "FPGA," a programmable logic device "PLD," a complex PLD "CPLD," a high-capacity PLD "HCPLD," a structured ASIC, or a programmable system-on-a-chip "SoC"), digital signal processors "DSPs," etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit "CPU," a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a gNB 108. The gNB 108 may provide a wireless access cell, for example, an NR cell, through which the UE may communicate with the gNB 108. The UE 104 and the gNB 108 may communicate over an air interface compatible with Fifth Generation "5G" NR system standards as provided by 3GPP technical specifications.

The UE 104 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; relaxed-IoT devices.

In some embodiments, the UE 104 may be a reduced capability "RedCap" UE, which may also be referred to as an "NR-Light" UE, that is designed to reduce device complexity and energy consumption. A RedCap UE may have less transmit/receive capabilities as compared to those designed for URLCC or eMBB. Some UE reduction features include reduced number of receive/transmit antennas (for example, less than four), UE bandwidth reduction (for example, up to 10 MHz), half-duplex frequency division duplexing, relaxed UE processing time, and relaxed UE processing capability. In some embodiments, a reduced capability UE may have more transmit/receive capabilities than narrowband Internet of things "NB-IoT" or Long Term Evolution—machine-type communication "LTE-M" devices.

Operation of devices designed for specific use cases may be described with respect to six performance categories including low-latency, reliability, peak data rate, coverage, low cost, and battery life. The main emphasis of the eMBB design is peak data rate; URLCC is low-latency and reliability; NB-IOT is battery life, low cost, and coverage; and enhanced machine-type coverage "eMTC" is coverage. RedCap devices may represent different compromises among these performance categories. For example, a RedCap device may include a slight emphasis on coverage, with peak data rate, reliability, low-latency, cost, and battery life generally be equal and slightly de-emphasized as compared to coverage.

In some embodiments, the characteristics of a reduced capability device may include a latency of between approximately 10-30 ms; a reliability (as measured by a failure probability of packets that are not successfully delivered to a receiver within a latency bound) as between 1/10,000-1/100,000; a data rate of approximately 10 megabits per second "Mbps" or below; or a coverage having a maximum coupling loss (for example, amount of coupling loss at which service can be delivered) of approximately 143 dBs.

The gNB 108 may transmit information (for example, data and control signaling) in the downlink direction by mapping logical channels on the transport channels, and transport channels onto physical channels. The logical channels may transfer data between a radio link control "RLC" and media access control "MAC" layers, the transport channels may transfer data between the MAC and Physical "PHY" layers; and the physical channels may transfer information across the air interface.

The physical channels may include a physical broadcast channel "PBCH"; a physical downlink control channel "PDCCH"; and a physical downlink shared channel "PDSCH."

The PBCH may be used to broadcast a master information block "MIB" to provide information to facilitate access to the NR cell. The MIB may include a system frame number, cell barred flag, and information that may be used to receive a system information block 1 "SIB1." The MIB and the SIB1 may be used to transmit minimum system information that provides a basic parameter set that a UE may use for initial access or acquiring any other system information.

The PBCH may be transmitted along with physical synchronization signals "PSS" and secondary synchronization signals "SSS" in a synchronization signal "SS"/PBCH blocks. The SS/PBCH blocks "SSBs" may be used by the UE 104 during a cell search procedure.

The PDSCH may be used to transfer end-user application data, signaling radio bearer "SRB" messages, system information messages (other than, for example, MIB), and paging messages.

The PDCCH may transfer downlink control information "DCI" that is used by the base station packet scheduler to allocate both uplink and downlink resources. The DCI may also be used to provide uplink power control commands, configure a slot format, or indicate that preemption has occurred.

The PDCCH may be mapped onto a specific search space set according to the content of the DCI. For example, if the DCI is being used to provide a resource allocation for a system information block 1 "SIB1," then the PDCCH may be mapped onto a Type 0 common search space set. Each search space set may be mapped onto a specific control resource set "CORSET" that defines a set of resource blocks and a number of symbols available to the search space set.

The gNB 108 may also transmit demodulation reference signals "DMRS" for the different physical channels. The DMRSs may be a sequence that is known to, or discoverable by, the UE 104. The UE 104 may compare a received version of the DMRS with the known DMRS sequence that was transmitted to estimate an impact of the propagation channel. The UE 104 may then apply an inverse of the propagation channel during a demodulation process of a corresponding physical channel transmission.

Previous releases of 3GPP NR provide that UEs are to support four receive "RX" antennas, with each RX antenna including a single antenna element or a panel of antenna elements, for PDCCH and PDSCH reception. The RX antennas may be coupled with RX chains in a 1:1 manner or an n:1 manner, where n>1, through an RF component, for example, a switcher. However, a reduced capability UE, such as UE 104, may have less RX antennas. While the reduction in the number of RX antennas may reduce costs and complexity of the UE 104, it may also reduce coverage. Thus, embodiments of the present disclosure provide procedures for PDCCH transmissions for system information block scheduling that provide sufficient coverage and is suitable for reduced capability devices that may only have one or two receive antennas.

Reduced capability devices may have bandwidth limited to, for example, 10 megahertz "MHz." Therefore, a bandwidth-reduced version of system information messages may be used to accommodate these reduced bandwidths. Various embodiments describe scheduling mechanisms that may be used for scheduling system information messages for reduced capability devices. For example, a number of repetitions for PDCCH transmissions within Type 0 CSS "Type0-PDCCH CSS" may be applied for scheduling a SIB1 that is directed to reduced capability UEs (hereinafter "RedCap SIB1").

Figure 2:
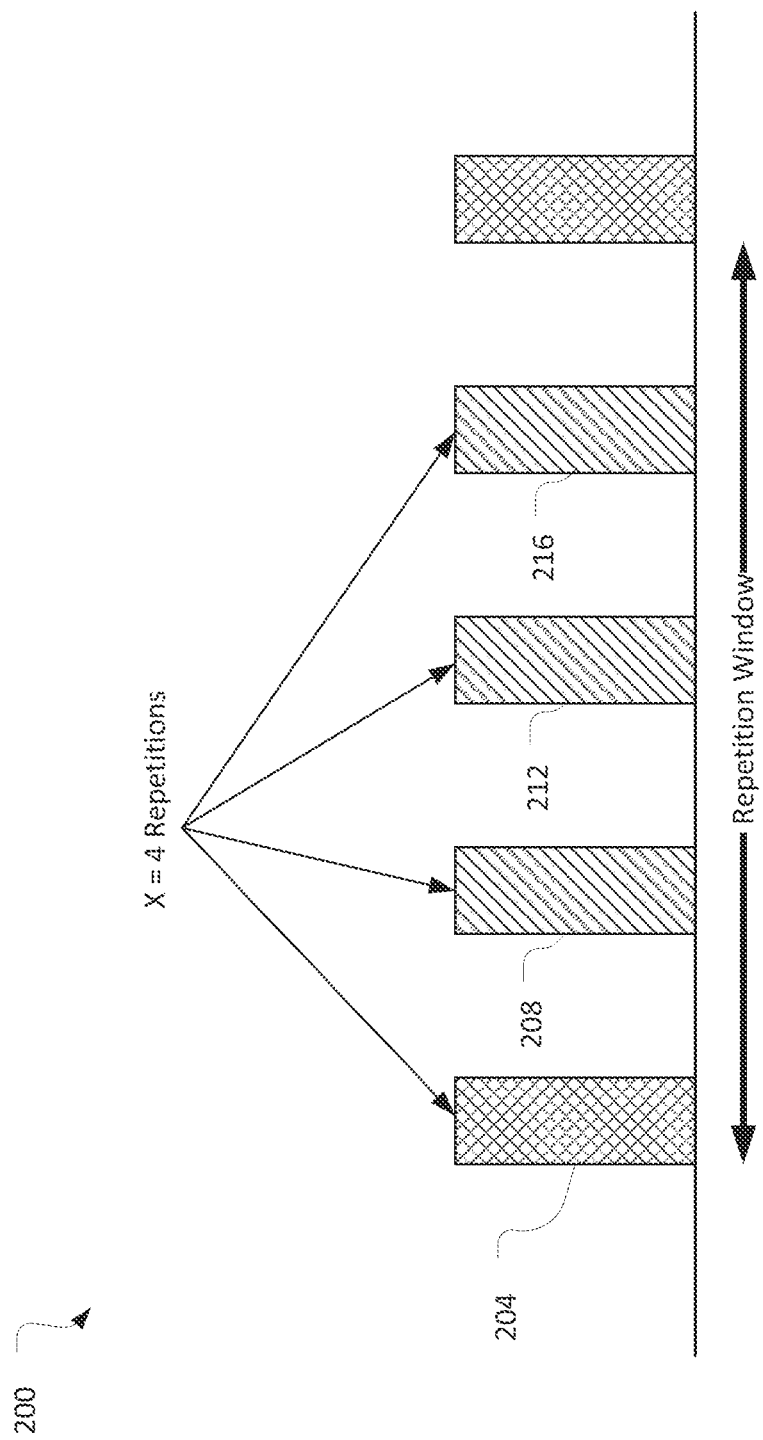
FIG. 2 illustrates a physical downlink control channel transmission in accordance with some embodiments.

FIG. 2 illustrates a PDCCH transmission 200 in accordance with some embodiments. The PDCCH transmission 200 may include four repetitions of a Type0-PDCCH CSS within a repetition window. In particular, the PDCCH transmission 200 may include a first repetition 204, a second repetition 208, a third repetition 212, and a fourth repetition 216. The number of repetitions may be referred to as "X" and the repetition window (or "period") may be referred to as "T," which may be in slots, subframes, unit of time, etc. A "repetition," as used herein, is a transmission that is to be, or has been, repeated. Thus, every instance of a repeated transmission may be referred to as a repetition, including the first, for example, repetition 204, and the last, for example, repetition 212.

In some designs, the number of repetitions for a Type0-PDCCH CSS within a period may be based on the following table, which may be fixed in a future version of a 3GPP technical specification.

TABLE 1

Number of repetitions for Type0-PDCCH CSS for RedCap devices

| Value of K | Number of Type0-PDCCH CSS Repetitions 'X' |
|---|---|
| 0 | N/A |
| 1 | 2 |
| 2 | 4 |
| 3 | 8 |

In some embodiments, within a period T slots, Type0-PDCCH CSS may be repeated X times, where $X \in \{0,2,4,8\}$. In one example, T=20 slots, so that Type0-PDCCH CSS shares some characteristics with legacy normal devices, which may reduce system control overhead.

Referring to Table 1, if the value of K is signaled to be '0,' the UE 104 may determine that repetition for Type0-PDCCH CSS is not enabled.

Various embodiments describe ways in which the UE 104 may determine the repetition number "X" used for a Type0-PDCCH CSS.

In some embodiments PHY processing operations may be designed to transmit information about the repetition number.

Figure 3:
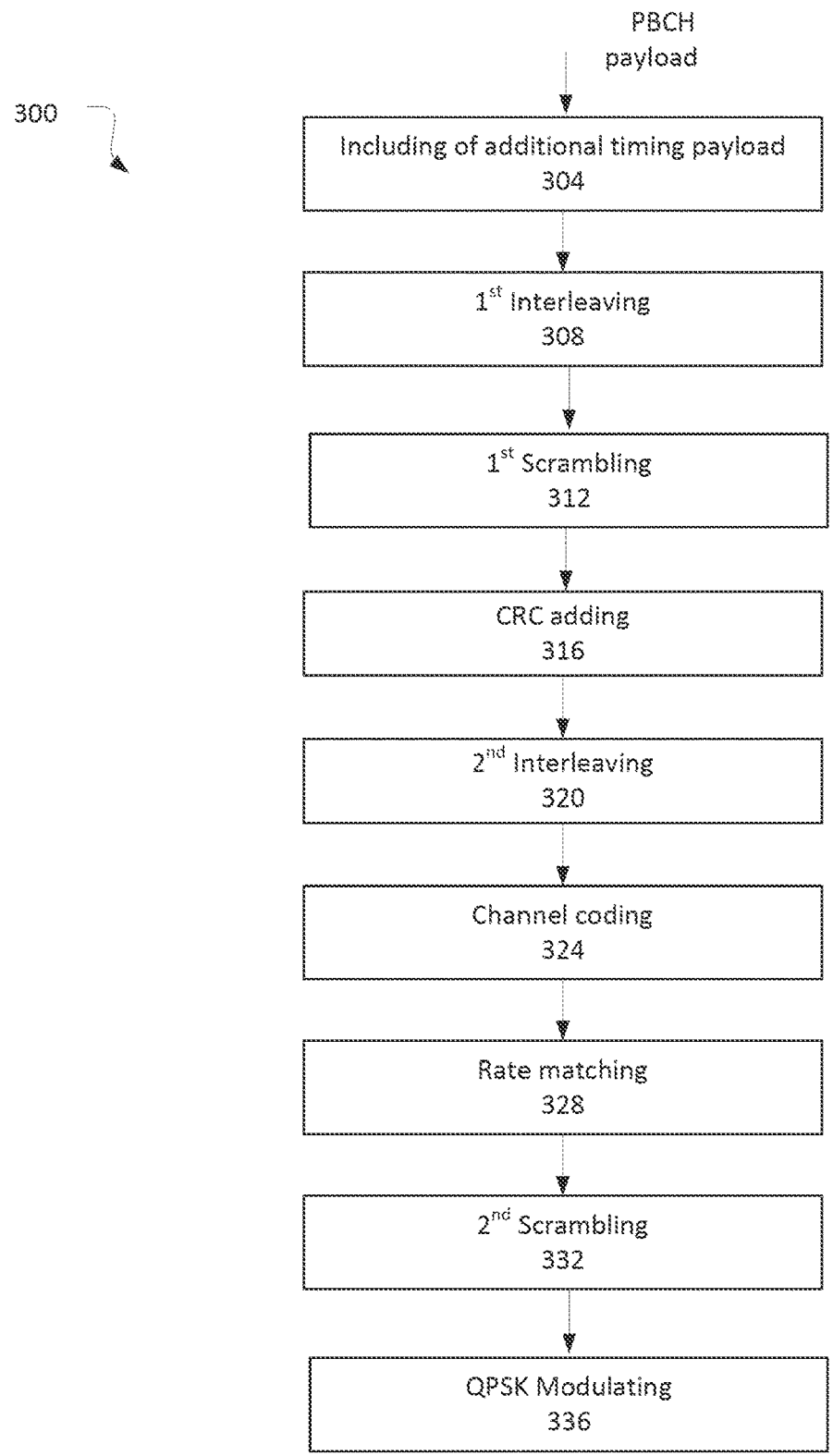
FIG. 3 illustrates physical layer processing operations in accordance with some embodiments.

FIG. 3 illustrates PHY processing operations 300 that may be performed by a transmitter of the gNB 108 to convey repetition value information in accordance with some embodiments. In some embodiments, the PHY processing operations 300 may be used for a PBCH that broadcasts the MIB. The MIB may occupy 24 bits, with an actual MIB payload of 23 bits and one additional bit to indicate a BCCH message type.

The operations 300 may include, at 304, including additional timing payload to PBCH payload, which may include the MIB transmission. The additional information may include eight bits with the four least significant bits "LSB" of the system frame number "SFN" and four bits that provide information regarding a subcarrier offset between SS/PBCH block and a main resource block grid.

After including the additional information at 304, the operations 300 may include a first interleaving at 308 to change the order of the bits before a first scrambling at 312. The scrambling may use a pseudo random sequence to 'randomly' change the values of bits. The order of the bits may not be changed. The scrambling sequence may be initialized with a physical layer cell identity "PCI" and may randomize the bit stream and intercell interference experienced by neighbor cells.

The operations 300 may further include, at 316, cyclic redundancy check "CRC" adding to add CRC bits to the scrambled sequence. In some embodiments, 24 CRC bits may be calculated from 32 bits of the scrambled sequence. This may be concatenated to generate a resultant packet size of 56 bits. The CRC bits may be used by a receiver of the UE 104 to detect bit errors within a decoded packet.

The operations 300 may further include, at 320, a second interleaving that is applied prior to channel coding at 324. The channel coding may be polar coding that increases the number of bits from 56 bits to 512 with a coding rate of 0.11. In other embodiments, other coding rates may be used.

After the channel coding, the operations 300 may include rate matching at 328 to ensure that a number of bits matches a capacity of the physical channel. Each transmission of the PBCH may be allocated 432 resource elements "REs." The PBCH may be transmitted with QPSK modulating so that the 432 REs are able to accommodate 432 QPSK symbols to transfer 864 bits of information. The rate matching at 328 may apply repetition to generate 864 bits from the set of 512 polar codes.

The operations 300 may further include, at 332, a second scrambling. The second scrambling may be initialized using the PCI and be based on 2 least significant bits "LSB" of the SS/PBCH block index for operating bands below 3 GHz or on 3 LSB of SS/PBCH block index for operating bands above 3 GHz.

The operations 300 may also include the quadrature phase-shift keying "QPSK" modulating at 336.

In some embodiments, the physical processing operations 300 may be adjusted to communicate the value of the parameter 'X.' For example, a value of parameter X may be signaled by selecting a corresponding sequence from a set of sequences [w0, w1, . . . , w23] for scrambling the CRC of the PBCH blocks that may occur during the CRC adding at 316. Table 2 illustrates CRC scrambling sequences that correspond to values of K and X in accordance with some embodiments.

TABLE 2

Number of repetitions for Type0-PDCCH CSS for RedCap devices

| Value of K | Number of Type0-PDCCH CSS Repetitions 'X' | [w0, w1, w2, w3, . . . , w23] |
|---|---|---|
| 0 | N/A | [0, 0, 0, 0, . . . , 0] |
| 1 | 2 | [0, 1, 0, 1, . . . , 0] |
| 2 | 4 | [1, 0, 1, 0, . . . , 1] |
| 3 | 8 | [1, 1, 1, 1, . . . , 1] |

Upon receiving a PBCH transmission, the UE 104 may use the different scrambling sequences to descramble the CRC bits. The UE 104 may identify the sequence that most closely aligns with the expected CRC based on the MIB payload. This sequence may indicate the number of repetitions with which the Type0-PDCCH CSS is to be transmitted.

In some embodiments, the value of parameter X may be transmitted using a reserved bit of the MIB payload. As discussed above, the 23-bit payload of the MIB includes one spare bit. This bit may be used to indicate the value of parameter X. In some embodiments, the bit may be combined with other information to provide the ability to select from more than two candidate values.

In some embodiments, the value of parameter X may be signaled by re-interpreting some reserved fields in the PBCH payload. For example, some fields of the PBCH payload may only be relevant for certain situations or frequency ranges. As one example, the bits "$a_{A+6}a_{A+7}$" m PBCH payload are reserved for FR1 and can be re-purposed to indicate the value of the parameter X in accordance with Table 2. If an MIB is transmitted with respect to the non-relevant situations/frequency ranges, these fields may be re-purposed to communicate the value of parameter X. Thus, a field of the PBCH payload may be used to convey repetition number information in one frequency range, and may be used for another purposes in another frequency range.

In some embodiments, the value of parameter X may be based on the frequency range. For example, parameter X may be associated with a first value in frequency range 1 "FR1," which may include frequencies between approximately 410 MHz to 7125 MHz, and associated with a second value in frequency range 2 "FR2," which may include frequencies between approximately 24.25 GHz to 52.6 GHz. Given the potential for signal attenuation in higher frequencies, the value of parameter X associated with FR2 may be higher than the value of parameter X associated with FR1. However, embodiments are not limited to this scenario.

The association of a particular value of parameter X to a frequency range may be configured to the UE 104 in a dynamic fashion. For example, the gNB 108 may configure the UE 104 with the association information. In other embodiments, the UE 104 may be preconfigured with the association information through, for example, the definition of the association information in a 3GPP technical specification.

While the above embodiments describe associating a particular value of parameter X with FR1 or FR2, it will be understood that values of parameter X may be associated with frequency ranges with smaller granularities. For example, in some embodiments a value of parameter X may be associated with one or more NR frequency bands as defined in, for example, 3GPP TS 38.101-1 v16.4.0 (2020 Jul. 17).

In some embodiments, a value of parameter X may be based on signaling information in conjunction with other information. For example, the UE 104 may be configured with a plurality of tables such as Table 2. Each of the tables may be associated with different frequency ranges, operating conditions, etc. Thus, the UE 104 may interpret signaling information (for example, a particular scrambling sequence used to scramble CRC bits) according to a table that is selected from the plurality of tables based on the frequency range of operation, operating conditions, etc.

In some embodiments, the repetition number X may be separately encoded in resource elements using polar code channel coding. The resource elements may be in the proximity of an SS/PBCH block that carries the PBCH, SSS, and the PSS. FIGS. 4A-4D illustrate different resource mapping schemes that may be used to carry complex-valued modulation symbols to provide an indication of the repetition number X in accordance with various embodiments.

Figure 4A:
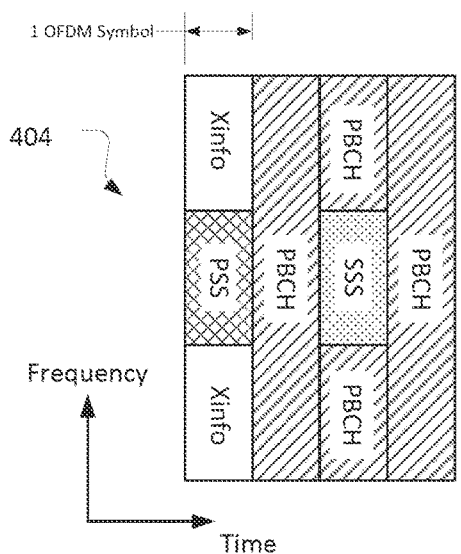
FIGS. 4A-4D illustrate mapping schemes in accordance with some embodiments.

FIG. 4A illustrates a mapping scheme 404 in which the modulation symbols that provide the information to indicate the repetition number X "Xinfo" are mapped to resource elements in an orthogonal frequency division multiplexing "OFDM" symbol that carries the PSS. The resource elements used in the mapping scheme 404 may be the resource elements that are in the PSS OFDM symbol but are not used for PSS transmission. For example, the resource elements may be on subcarriers on frequencies above and below the PSS. The resource elements may also be fully overlapped with the PBCH bandwidth. For example, the resource elements may be disposed within the PBCH bandwidth.

Figure 4B:
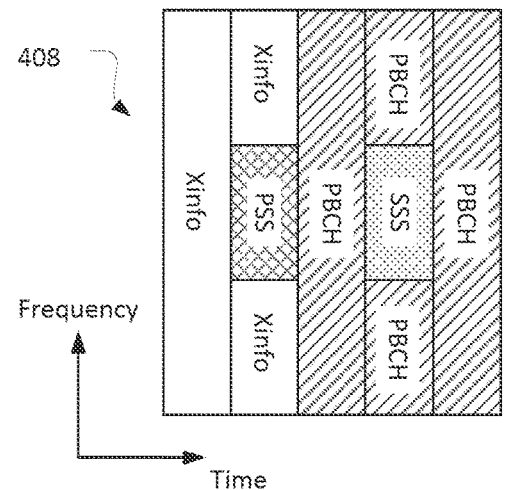

FIG. 4B illustrates a mapping scheme 408 in accordance with some embodiments. The mapping scheme 408 may provide that the modulation symbols that carry the Xinfo are mapped to the resource elements in the OFDM symbol that carries the PSS and/or an immediately preceding OFDM symbol. This embodiment may be used when it is desirable to convey additional Xinfo bits or to provide additional redundancy with respect to the mapping scheme 404.

Figure 4C:
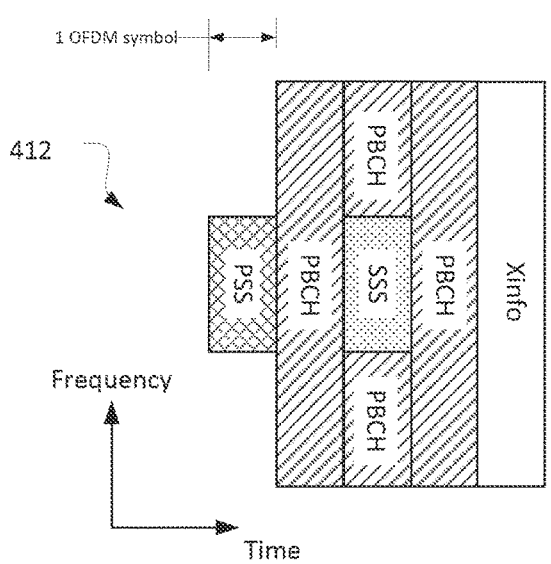

FIG. 4C illustrates a mapping scheme 412 in accordance with some embodiments. The mapping scheme 412 may provide that the modulation symbols that carry the Xinfo are mapped to resource elements that are time adjacent to the SSB block. For example, the resource elements may be in an OFDM symbol that immediately follows the OFDM symbols of the SS/PBCH block. The OFDM symbol carrying the Xinfo may be immediately adjacent to the second full-bandwidth PBCH. The resource elements used in the mapping scheme 412 may use the same bandwidth of the SS/PBCH block.

Figure 4D:
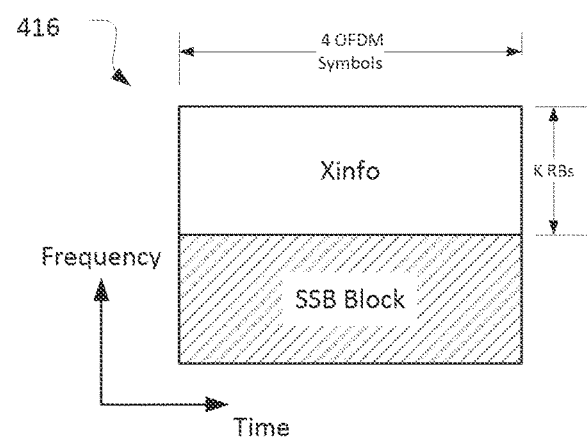

FIG. 4D illustrates a mapping scheme 416 in accordance with some embodiments. The mapping scheme 416 may provide that the modulation symbols that carry the Xinfo are mapped to resource elements that are frequency adjacent to the SSB block. For example, the resource elements may include four OFDM symbols, which may be the same as the SSB block, and one or more resource blocks "RBs" (for example, K RBs). In some embodiments, the value K may be defined in a 3GPP TS or may be configured to the UE.

As discussed above, the DMRS may be used by the UE 104 to estimate a propagation channel experienced by the PDCCH. This information may be used to help demodulate PDCCH and subsequently decode the DCI in the PDCCH. The DMRS is a pseudo-random sequence that may be generated based on an initialization value "$c_{init}$." In some embodiments, the initialization value may be a function of the repetition value X.

Figure 5:
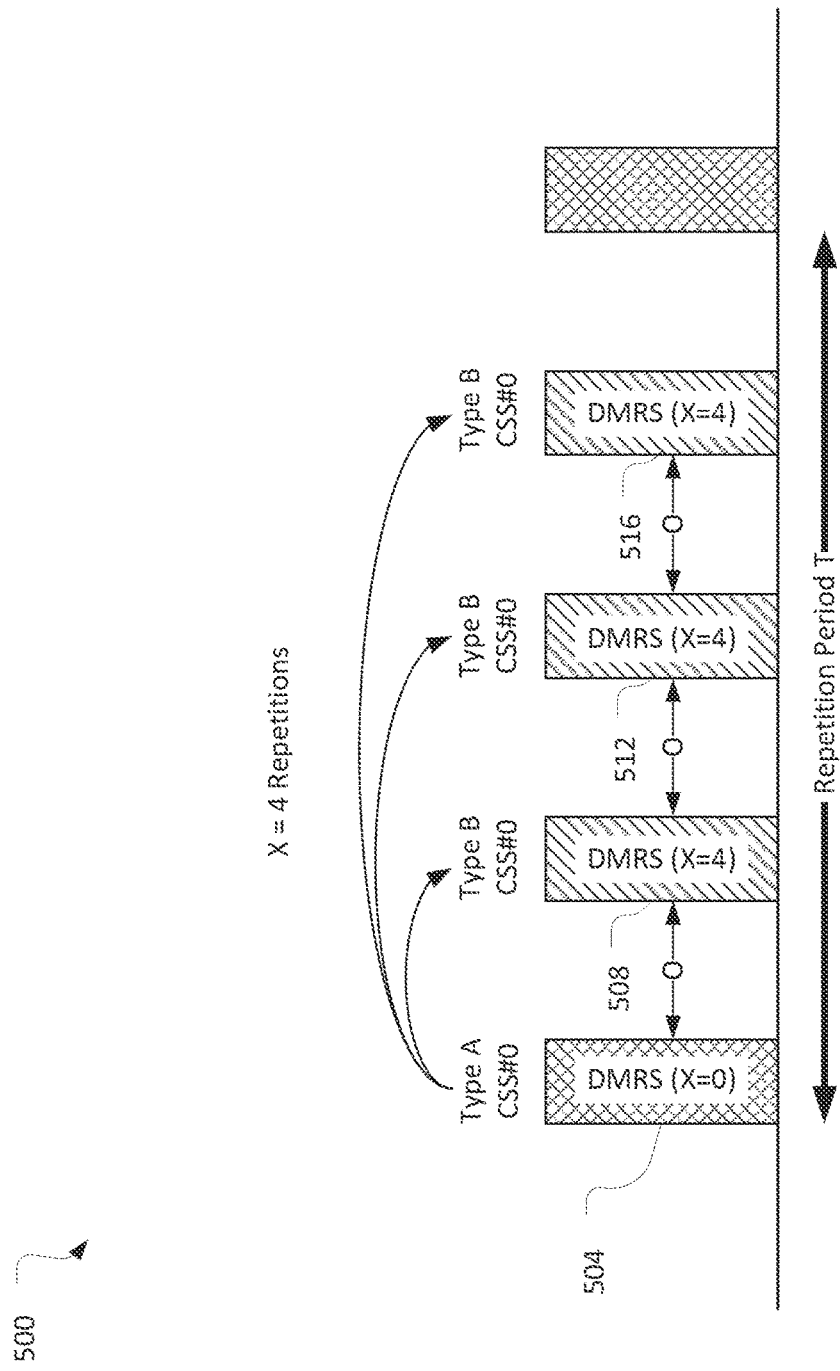
FIG. 5 illustrates a physical downlink control channel transmission in accordance with some embodiments.

FIG. 5 illustrates a PDCCH transmission 500 in accordance with some embodiments. Like PDCCH transmission 200, PDCCH transmission 500 may include four repetitions of a Type0-PDCCH CSS (also referred to as "CSS #0") within a repetition window. The repetitions may include a first repetition 504, a second repetition 508, a third repetition 512, and a fourth repetition 516.

In some embodiments, two types of CSS #0 may be defined for DMRS sequence transmission depending on whether the transmission is to be used by non-RedCap devices or only visible/utilizable by RedCap devices. A first type, which may be referred to as TypeA CSS#0, may be the first CSS #0 transmitted in a repetition window. This CSS #0 may be used by non-RedCap devices. A second type, which may be referred to as TypeB CSS #0, may be repeated CSS #0s that are used to transmit the same DCI transmitted by TypeA CSS #0 in the repetition window. Thus, with reference to FIG. 5, the first repetition 504 may be a Type A CSS #0, while repetitions 508, 512, and 516 may all be Type B CSS #0.

In some embodiments, the DMRS sequence may be initialized based on the repetition value X. For example, the DMRS sequence for a Type B CSS #0 for OFDM symbol l may be defined as:

$$r_l(m) = \frac{1}{\sqrt{2}}(1 - 2 \cdot c(2m)) + j\frac{1}{\sqrt{2}}(1 - 2 \cdot c(2m+1)), c_{init} = f(X);$$

Alternative 1: $f(X)=(2^{17}(N_{symb}^{slot} n_{s,f}^{\mu}+l+1)(2N_{ID}+1)+2N_{ID}+X) \bmod 2^{31}$;

Alternative 2: $f(X)=(2^{17}(N_{symb}^{slot} n_{s,f}^{\mu}+l+1(2N_{ID}+1+X)+2N_{ID}+X) \bmod 2^{31}$;

where $c_{init}$ is the initialization value, $N_{symb}^{slot}$ is a number of symbols per slot, $N_{ID}$ is a physical layer cell identity, and $n_{s,f}^{\mu}$ is a slot number within a frame; and $N_{ID} \in \{0, 1, \ldots, 65535\}$ is given by higher-layer parameter pdcch-DMRS-ScramblingID, if provided, otherwise $N_{ID}$ may be the physical layer cell identity, for example, $N_{ID}^{cell}$.

For Type A CSS #0, repetition 504, X may be set to 0 for the DMRS sequence generation. In some embodiments, the DMRS sequence provided above for Type B CSS #0 may also be used for Type A CSS #0, with X=0; in other embodiments, Type A CSS #0 may use a legacy DMRS sequence. In either case, the Type A CSS #0 may be readable to a non-RedCap device, for example, Release 15 eMBB devices.

For Type B CSS #0, for example, repetitions 508, 512, and 516, X may be set to 4 for the DMRS sequence generation.

The UE 104 may perform DMRS sequence correction under different hypotheses of X values to determine the repetition number of CSS #0. In some embodiments, some overhead signaling may be incurred by requiring at least one repetition of the CSS #0, for example, repetition 508.

In this way, one or more explicit bits of an X value may be transmitted through a DMRS sequence used for a first repeated transmission of the Type0-PDCCH CSS (for example, repetition 508), within the repetition window of slots.

Adjacent PDCCH repetitions may be separated by a gap "O," which may be a number of slots. In some embodiments, the gap O may be defined in a 3GPP technical specification, indicated by a PBCH/MIB payload, or a combination of the two. For example, two values of 'O' may be defined in a technical specification, for example O ∈ {0 slots, 1 slot} and then one reserved bit in a PBCH payload may be used to select between the two values.

Figure 6:
FIG. 6 illustrates an operational flow/algorithmic structure in accordance with some embodiments.
Figure 6:
Figure 6:

FIG. 6 may include an operation flow/algorithmic structure 600 in accordance with some embodiments. The operation flow/algorithmic structure 600 may be performed or implemented by a UE such as, for example, UE 104 or 900; or components thereof, for example, baseband processor 904A.

The operation flow/algorithmic structure 600 may include, at 604, determining a repetition value for a PDCCH of a Type 0 CSS. The PDCCH may carry scheduling information for a RedCap SIB1.

In some embodiments, determining the repetition value may include determining which sequence of a plurality of sequences is used to scramble a CRC of a PBCH transmission. The UE may access a table that correlates a plurality of scrambling sequences to a corresponding plurality of repetition values. The UE may attempt to decode the CRC using one or more of the plurality of scrambling sequences until the CRC is correctly decoded. Upon correctly decoding the CRC, the UE may reference the table information using the successful scrambling sequence to determine the corresponding repetition value.

In some embodiments, determining the repetition value may additionally/alternatively include determining a frequency of operation and comparing the frequency to pre-defined or otherwise configured ranges of frequencies that respectively correspond to repetition value information.

In some embodiments, determining the repetition value may include decoding a PBCH to determine one or more bits in, for example, a field. In some embodiments, the field may be used for repetition value indication for a first frequency range and fix another indication in a second frequency range.

In some embodiments, determining the repetition value may include decoding resource elements that carry complex-valued modulation symbols that provide an indication of the repetition value. The resource elements may be in, or adjacent (in time or frequency domain) to, OFDM symbols used to transmit a SSB block.

In some embodiments, determining the repetition value may include detecting or otherwise determining a initialization value used to generate a DMRS sequence. In some embodiments, the UE may receive a DMRS that is transmitted for a Type0 PDCCH CSS. The DMRS may have been transmitted with an initialization value that corresponds to a repetition value. The UE may attempt to decode the DMRS using a plurality of candidate repetition values to determine the initialization value that is used for the DMRS. The candidate repetition value that causes the UE to successfully decode the DMRS may be determined to be the repetition value that is used for the repeated transmission of the Type0-PDCCH CSS.

In some embodiments, the DMRS used to determine the repetition value may be associated with a second or later repetition of the PDCCH. For example, in some embodiments, the DMRS used for a first repetition of a PDCCH may not necessarily indicate the repetition value that correctly indicates the number of repetitions of the PDCCH. This may be used to facilitate decoding of a PDCCH by a legacy device. However, the DMRSs used for subsequent repetitions of the PDCCH may correspond to the proper repetition value that may be determined by a RedCap device.

The operation flow/algorithmic structure 600 may further include, at 608, decoding the PDCCH based on the repetition value to determine scheduling information for the RedCap SIB1. In some embodiments, the UE may jointly decode all of the repetitions of the PDCCH together to detect the DCI that schedules a PDSCH to carry the RedCap SIB1.

The operation flow/algorithmic structure 600 may further include, at 612, decoding the RedCap SIB1 as scheduled by the DCI decoded at 608.

Figure 7:
FIG. 7 illustrates an operational flow/algorithmic structure in accordance with some embodiments.

FIG. 7 may include an operation flow/algorithmic structure 700 in accordance with some embodiments. The operation flow/algorithmic structure 700 may be performed or implemented by a UE such as, for example, UE 104 or 900; or components thereof, for example, baseband processor 904A

The operation flow/algorithmic structure 700 may include, at 704, determining an initialization value of a DMRS sequence to decode a DMRS. As described above, the DMRS sequence may be initialized with an initialization value that is based on the repetition value of X. The UE may attempt to decode a DMRS using a number of candidate values of X to determine the initialization value that was used to initialized the DMRS sequence.

The operation flow/algorithmic structure 700 may further include, at 708, estimating a propagation channel for a PDCCH transmission based on the DMRS. As the UE may have knowledge of the sequence transmitted by the DMRS, it may deduce the composite propagation channel by comparing the received DMRS with the transmitted DMRS sequence. And, given that the DMRS may be transmitted by the same antenna port used to transmit the PDCCH, the estimation of the propagation channel for the DMRS may also apply to the corresponding PDCCH.

The operation flow/algorithmic structure 700 may further include, at 712, determining a number of repetitions of a PDCCH transmission based on the initialization parameter. As described above, the repetition value that provides the initialization value for the DMRS sequence that results in the proper decoding of the DMRS sequence may correspond to the number of repetitions of the PDCCH transmission.

In some embodiments, the initialization parameter used for the DMRS of the first repetition may be different than the initialization parameter used for the DMRS of the second and later repetitions. In these embodiments, the initialization parameter used for the second and later repetitions of the PDCCH may correspond to the repetition value. For the second and later repetitions, the UE may perform DMRS sequence correction using one or more candidate repetition values to determine value that corresponds to the proper initialization parameter.

The operation flow/algorithmic stnicture 700 may further include, at 716, processing the PDCCH transmission in a Type 0 common SSS based on the propagation channel and the number of repetitions. In some embodiments, the UE may demodulate the PDCCH transmission based on the propagation channel, and jointly decode the repetitions of the PDCCH transmission to recover the DCI. To jointly decode the plurality of repetitions, the UE may perform a soft combining of the bits from each of the repetitions with each confirming bit increasing a level of confidence associated with the corresponding bit.

Figure 8:
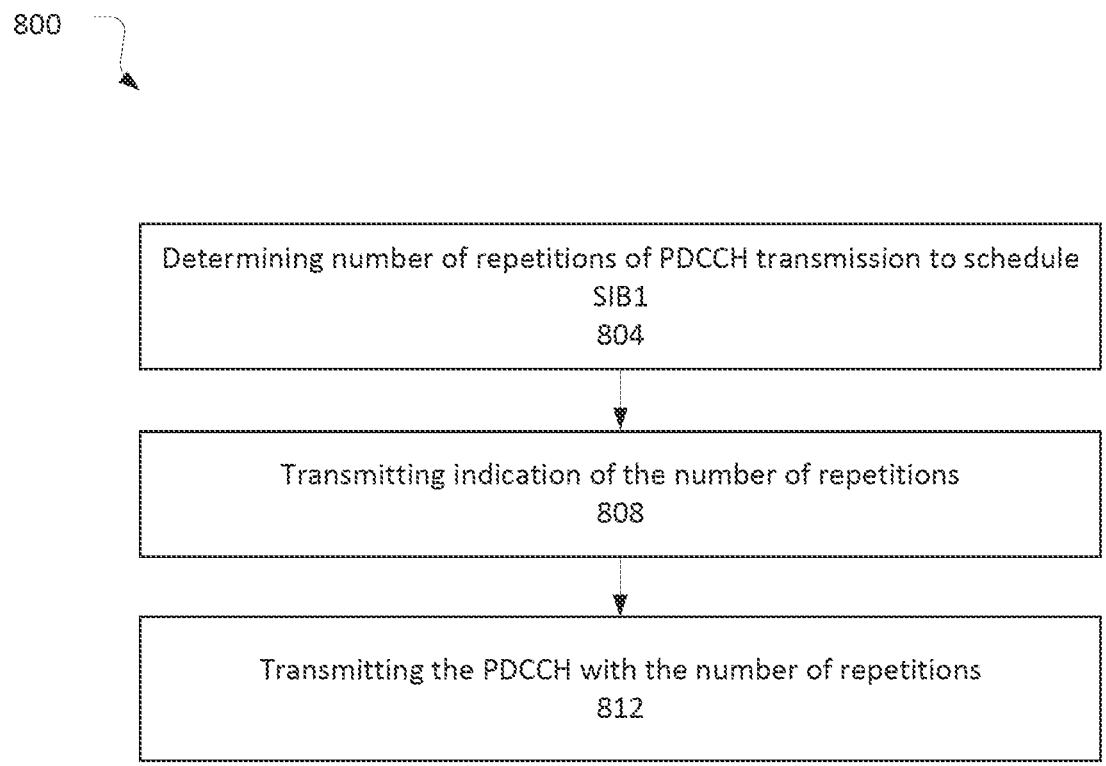
FIG. 8 illustrates an operational flow/algorithmic structure in accordance with some embodiments.

FIG. 8 may include an operation flow/algorithmic structure 800 in accordance with some embodiments. In some embodiments, the operation flow/algorithmic structure 800 may be performed or implemented by a gNB, for example, gNB 108 or 1000; or components thereof, for example, baseband processor 1004A.

The operation flow/algorithmic structure 800 may include, at 804, determining a number of repetitions of a PDCCH transmission to schedule a SIB1. In some embodiments, the repetition value may be selected based on network conditions, operating frequencies, etc. In various embodiments, the number of repetitions may be 2, 4, 8, or another value.

The operation flow/algorithmic structure 800 may further include, at 808, transmitting an indication of the number of repetitions. In some embodiments, the gNB may select a scrambling sequence that corresponds to the repetition value and use the scrambling sequence to scramble CRC of PBCH blocks. The gNB may transmit the indication by transmission of the scrambled CRC. In other embodiments, the gNB may select an initialization parameter to initialize a DMRS corresponding to one or more PDCCH repetitions. The gNB may transmit the indication of the repetition value by transmitting the DMRS.

The operation flow/algorithmic structure 800 may further include, at 812, transmitting the PDCCH with the number of repetitions. The PDCCH may include DCI to schedule a RedCap SIB1 and may be transmitted in a Type 0 common SSS as described herein.

Figure 9:
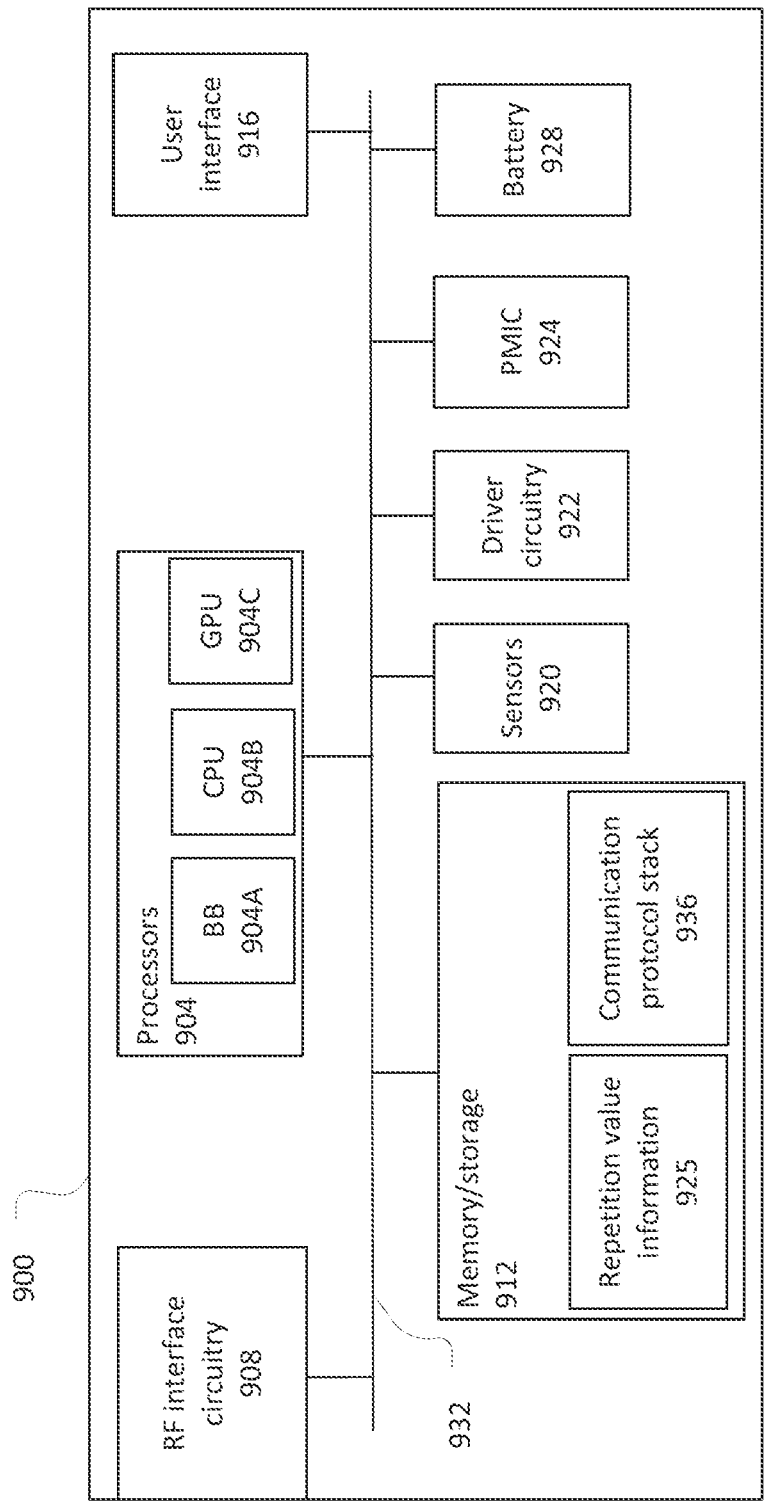
FIG. 9 illustrates a user equipment in accordance with some embodiments.

FIG. 9 illustrates a UE 900 in accordance with some embodiments. The UE 900 may be similar to and substantially interchangeable with UE 104 of FIG. 1.

Similar to that described above with respect to UE 104, the UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; relaxed-IoT devices. In some embodiments, the UE may be a RedCap UE or NR-Light UE.

The UE 900 may include processors 904, RF interface circuitry 908, memory/storage 912, user interface 916, sensors 920, driver circuitry 922, power management integrated circuit "PMIC" 924, and battery 928. The components of the UE 900 may be implemented as integrated circuits "ICs," portions thereof, discrete electronic devices, or other modules, logic, hardware, software, firmware, or a combination thereof. The block diagram of FIG. 9 is intended to show a high-level view of some of the components of the UE 900.

However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, optical connection, etc. that allows various circuit components (on common or different chips or chipsets) to interact with one another.

The processors 904 may include processor circuitry such as, for example, baseband processor circuitry "BB" 904A, central processor unit circuitry "CPU" 904B, and graphics processor unit circuitry "GPU" 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The baseband processor circuitry 904A may also access repetition value information 925 from memory/storage 912 to determine a number of repetitions with which a PDCCH used to schedule a RedCap SIB1 is to be transmitted. The repetition value information 925 may include, for example, the repetition value itself, tables such as Table 1 or Table 2, frequency range information, or other data structures that may be accessed in conjunction with, or independently from, signaled information to determine the number of repetitions.

The memory/storage 912 may include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory "DRAM," static random access memory "SRAM," eraseable programmable read only memory "EPROM," electrically eraseable programmable read only memory "EEPROM," Flash memory, solid-state memory, or any other type of memory device technology.

The RF interface circuitry 908 may include transceiver circuitry and radio frequency front module "RFEM" that allows the UE 900 to communicate with other devices over a radio access network. The RF interface circuitry 908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna. and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antennas.

In various embodiments, the RF interface circuitry 908 may be configured to transmit/receive signals in a manner compatible with NR access technologies.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices; etc.

The driver circuitry 922 may include software and hardware elements that operate to control particular devices that are embedded in the UE 900, attached to the UE 900, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The power management integrated circuitry "PMIC" 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 900 may power down for brief intervals of time and thus save power. If there is no data traffic activity for an extended period of time, then the UE 900 may transition off to an RRC_Idle state, where it disconnects from the network and does not perform operations such as channel quality feedback, handover, etc. The UE 900 goes into a very low power state and it performs paging where again it periodically wakes up to listen to the network and then powers down again. The UE 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
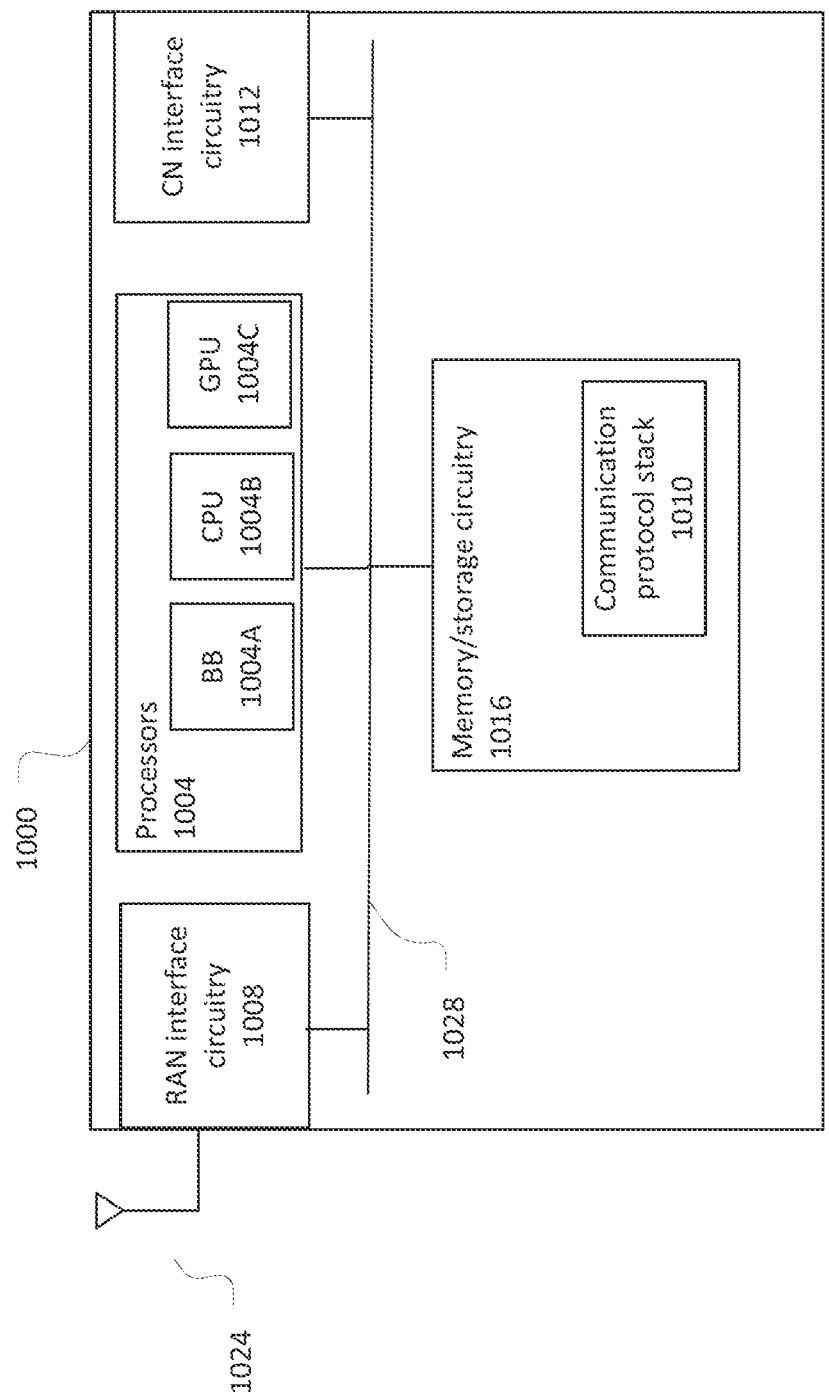
FIG. 10 illustrates a gNB in accordance with some embodiments.

FIG. 10 illustrates a gNB 1000 in accordance with some embodiments. The gNB node 1000 may similar to and substantially interchangeable with gNB 108.

The gNB 1000 may include processors 1004, RF interface circuitry 1008, core network "CN" interface circuitry 1012, and memory/storage circuitry 1016.

The components of the RAN node 1000 may be coupled with various other components over one or more interconnects 1028.

The processors 1004, RF interface circuitry 1008, memory/storage circuitry 1016 (including communication protocol stack 1010), and interconnects 1028 may be similar to like-named elements shown and described with respect to FIG. 9.

The CN interface circuitry 1012 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB node 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a UE, the method comprising: determining a repetition value that corresponds to a number of repetitions of a physical downlink control channel "PDCCH" of a Type 0 common search space set "CSS"; and decoding the PDCCH based on the number of repetitions to determine scheduling information for a system information block 1 "SIB1" directed to reduced-capability UEs.

Example 2 may include the method of example 1 or some other example herein, further comprising determining a sequence that is used to scramble a cyclic redundancy check of a physical broadcast channel block; and determining the repetition value based on the sequence.

Example 3 may include the method of example 2 or some other example herein, further comprising: accessing a table that maps a plurality of sequences to a plurality of repetition values; and determining the repetition value based on the table.

Example 4 may include the method of example 1 or some other example herein, further comprising: decoding a physical broadcast channel "PBCH" and determining an indication of the repetition value based on one or more bits in a field of the PBCH.

Example 5 may include the method of example 4 some other example herein, wherein the field is reserved for signaling information related to a first frequency range and the PDCCH is transmitted in a second frequency range that is different from the first frequency range.

Example 6 may include the method of example 1 or some other example herein, further comprising decoding control signaling to detect an indication of the repetition value.

Example 7 may include the method of example 6 or some other example herein, wherein decoding the control signaling includes decoding one or more resource elements of an orthogonal frequency division multiplexing "OFDM" symbol that also includes a primary synchronization signal.

Example 8 may include the method of example 7 or some other example herein, wherein the OFDM symbol is a first OFDM symbol and decoding the control signaling includes decoding a second OFDM symbol that is frequency adjacent to, and immediately before, the first OFDM symbol.

Example 9 may include the method of example 6 or some other example herein, wherein decoding the control signaling includes decoding one or more resource elements of a first orthogonal frequency division multiplexing "OFDM" symbol that is frequency adjacent to, and immediately after, a second OFDM symbol that carries a physical broadcast channel.

Example 10 may include the method of example 6 or some other example herein, wherein decoding the control signaling includes decoding a plurality of resource blocks frequency adjacent to a synchronization signal block.

Example 11 may include the method of example 1 or some other example herein, further comprising: detecting an initialization value associated with a demodulation reference signal "DMRS"; and determining the repetition value based on the initialization value.

Example 12 may include a method of operating a UE, the method comprising storing information related to a demodulation reference signal "DMRS" sequence; determining an initialization value of the DMRS sequence to decode a DMRS; estimating, based on the DMRS, a propagation channel for a physical downlink control channel "PDCCH" transmission; determining a number of repetitions of the PDCCH transmission based on the initialization parameter; and processing the PDCCH transmission as received in a Type 0 common search space based on the propagation channel and the number of repetitions.

Example 13 may include the method of example 12 or some other example herein, wherein the initialization parameter is a first initialization parameter, the DMRS is a second DMRS, the PDCCH transmission is a first PDCCH transmission, and the method further comprises: determining a second initialization parameter to decode a second DMRS; estimating, based on the second DMRS, a propagation channel for a second PDCCH transmission, wherein the first PDCCH transmission is a repetition of the second PDCCH transmission and the second initialization parameter is different from the first initialization parameter.

Example 14 may include the method of example 12 or some other example herein, wherein determining the initialization parameter includes performing DMRS sequence correction using one or more candidate repetition values; successfully decoding the DMRS using a first repetition value of the one or more candidate repetition values, wherein the first repetition value corresponds to the number of repetitions.

Example 15 may include the method of example 12 or some other example herein, further comprising: performing soft combining of the number of repetitions of the PDCCH transmission to recover information to schedule a system information broadcast 1 "SIB1" transmission for reduced capability UEs.

Example 16 may include the method of example 12 or some other example herein, further comprising determining a time gap between adjacent repetitions of the PDCCH transmission based on a predetermined configuration or an indication in a physical broadcast channel transmission.

Example 17 may include a method of operating a gNB, the method comprising: determining a number of repetitions of a physical downlink control channel "PDCCH" transmission to schedule system information broadcast 1 "SIB1" for reduced capability user equipment; transmitting an indication of the number of repetitions; and transmitting the PDCCH transmission with the number of repetitions.

Example 18 may include the method of example 17 or some other example herein, wherein transmitting the indication comprises scrambling a cyclic redundancy check of physical broadcast channel with a scrambling sequence that corresponds to the number of repetitions.

Example 19 may include the method of example 17 or some other example herein, wherein transmitting the indication comprises: encoding the indication in a plurality of resource elements, wherein the plurality of resource elements are: in a first orthogonal frequency division multiplexing "OFDM" symbol that includes a primary synchronization signal or is time adjacent to a physical broadcast channel; or in a plurality of resource blocks frequency adjacent to a synchronization signal and physical broadcast channel block.

Example 20 may include the method of example 17 or some other example herein, wherein transmitting the indication comprises: initializing a modulation reference signal "DMRS" sequence for the PDCCH transmission based on the number of repetitions.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or ated to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure, Example 29 may include a signal encoded with a datagram, IE, packet, frame, segment, PDU, or message as described in or related to any of examples 1-64, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable storage media having instructions that, when executed, cause processing circuitry to:
    determine a repetition value that corresponds to a number of repetitions of a physical downlink control channel (PDCCH) of a Type 0 common search space set (CSS); and
    decode the PDCCH based on the number of repetitions to determine scheduling information for a system information block 1 (SIB1) directed to reduced-capability user equipments (UEs).

2. The one or more non-transitory computer-readable media of claim 1, wherein the instructions, when executed, further cause the processing circuitry to:
    determine a sequence that is used to scramble a cyclic redundancy check of a physical broadcast channel block; and
    determine the repetition value based on the sequence.

3. The one or more non-transitory computer-readable media of claim 2, wherein the instructions, when executed, further cause the processing circuitry to:
    access a table that maps a plurality of sequences to a plurality of repetition values; and
    determine the repetition value based on the table.

4. The one or more non-transitory computer-readable media of claim 1, wherein the instructions, when executed, further cause the processing circuitry to:
    decode a physical broadcast channel (PBCH); and
    determine an indication of the repetition value based on one or more bits in a field of the PBCH.

5. The one or more non-transitory computer-readable media of claim 4, wherein the field is reserved for signaling information related to a first frequency range and the PDCCH is transmitted in a second frequency range that is different from the first frequency range.

6. The one or more non-transitory computer-readable media of claim 1, wherein the instructions, when executed, further cause the processing circuitry to: decode control signaling to detect an indication of the repetition value.

7. The one or more non-transitory computer-readable media of claim 6, wherein to decode the control signaling, the instructions further cause the processing circuitry to: decode one or more resource elements of an orthogonal frequency division multiplexing (OFDM) symbol that also includes a primary synchronization signal.

8. The one or more non-transitory computer-readable media of claim 7, wherein the OFDM symbol is a first OFDM symbol and to decode the control signaling, the instructions further cause the processing circuitry to decode a second OFDM symbol that is frequency adjacent to, and immediately before, the first OFDM symbol.

9. The one or more non-transitory computer-readable media of claim 6, wherein to decode the control signaling the instructions further cause the processing circuitry to: decode one or more resource elements of a first orthogonal frequency division multiplexing (OFDM) symbol that is frequency adjacent to, and immediately after, a second OFDM symbol that carries a physical broadcast channel.

10. The one or more non-transitory computer-readable media of claim 6, wherein to decode the control signaling, the instructions further cause the processing circuitry to: decode a plurality of resource blocks frequency adjacent to a synchronization signal block.

11. The one or more non-transitory computer-readable media of claim 1, wherein the instructions, when executed, further cause the processing circuitry to:
    detect an initialization value associated with a demodulation reference signal (DMRS); and
    determine the repetition value based on the initialization value.

12. An apparatus comprising:
    memory having information related to a demodulation reference signal (DMRS) sequence; and
    processing circuitry coupled with the memory to access the information, the processing circuitry to:
        determine an initialization parameter of the DMRS sequence to decode a DMRS;
        estimate, based on the DMRS, a propagation channel for a physical downlink control channel (PDCCH) transmission;
        determine a number of repetitions of the PDCCH transmission based on the initialization parameter; and
        process the PDCCH transmission as received in a Type 0 common search space based on the propagation channel and the number of repetitions.

13. The apparatus of claim 12, wherein the initialization parameter is a first initialization parameter, the DMRS is a second DMRS, the PDCCH transmission is a first PDCCH transmission, and the processing circuitry is further to:
    determine a second initialization parameter to decode a second DMRS; and
    estimate, based on the second DMRS, a propagation channel for a second PDCCH transmission, wherein the first PDCCH transmission is a repetition of the second PDCCH transmission and the second initialization parameter is different from the first initialization parameter.

14. The apparatus of claim 12, wherein to determine the initialization parameter the processing circuitry is further to:
    perform DMRS sequence correction using one or more candidate repetition values; and successfully decode the DMRS using a first repetition value of the one or more candidate repetition values, wherein the first repetition value corresponds to the number of repetitions.

15. The apparatus of claim 12, wherein the processing circuitry is further to: perform soft combining of the number of repetitions of the PDCCH transmission to recover information to schedule a system information broadcast 1 (SIB1) transmission for reduced capability UEs.

16. The apparatus of claim 12, wherein the processing circuitry is further to determine a time gap between adjacent repetitions of the PDCCH transmission based on a predetermined configuration or an indication in a physical broadcast channel transmission.

17. A method comprising:
    determining a number of repetitions of a physical downlink control channel (PDCCH) transmission to schedule system information broadcast 1 (SIB1) for reduced capability user equipment;
    transmitting an indication of the number of repetitions; and
    transmitting the PDCCH transmission with the number of repetitions.

18. The method of claim 17, wherein transmitting the indication comprises scrambling a cyclic redundancy check of physical broadcast channel with a scrambling sequence that corresponds to the number of repetitions.

19. The method of claim 17, wherein transmitting the indication comprises: encoding the indication in a plurality of resource elements, wherein the plurality of resource elements are: in a first orthogonal frequency division multiplexing (OFDM) symbol that includes a primary synchronization signal or is time adjacent to a physical broadcast channel; or in a plurality of resource blocks frequency adjacent to a synchronization signal and physical broadcast channel block.

20. The method of claim 17, wherein transmitting the indication comprises: initializing a modulation reference signal (DMRS) sequence for the PDCCH transmission based on the number of repetitions.

\* \* \* \* \*